July 26, 1966 H. P. HASELL ET AL 3,262,296
APPARATUS FOR REPAIRING AND FEEDING HOLLOW METAL ARTICLES
Filed June 14, 1963 5 Sheets-Sheet 1
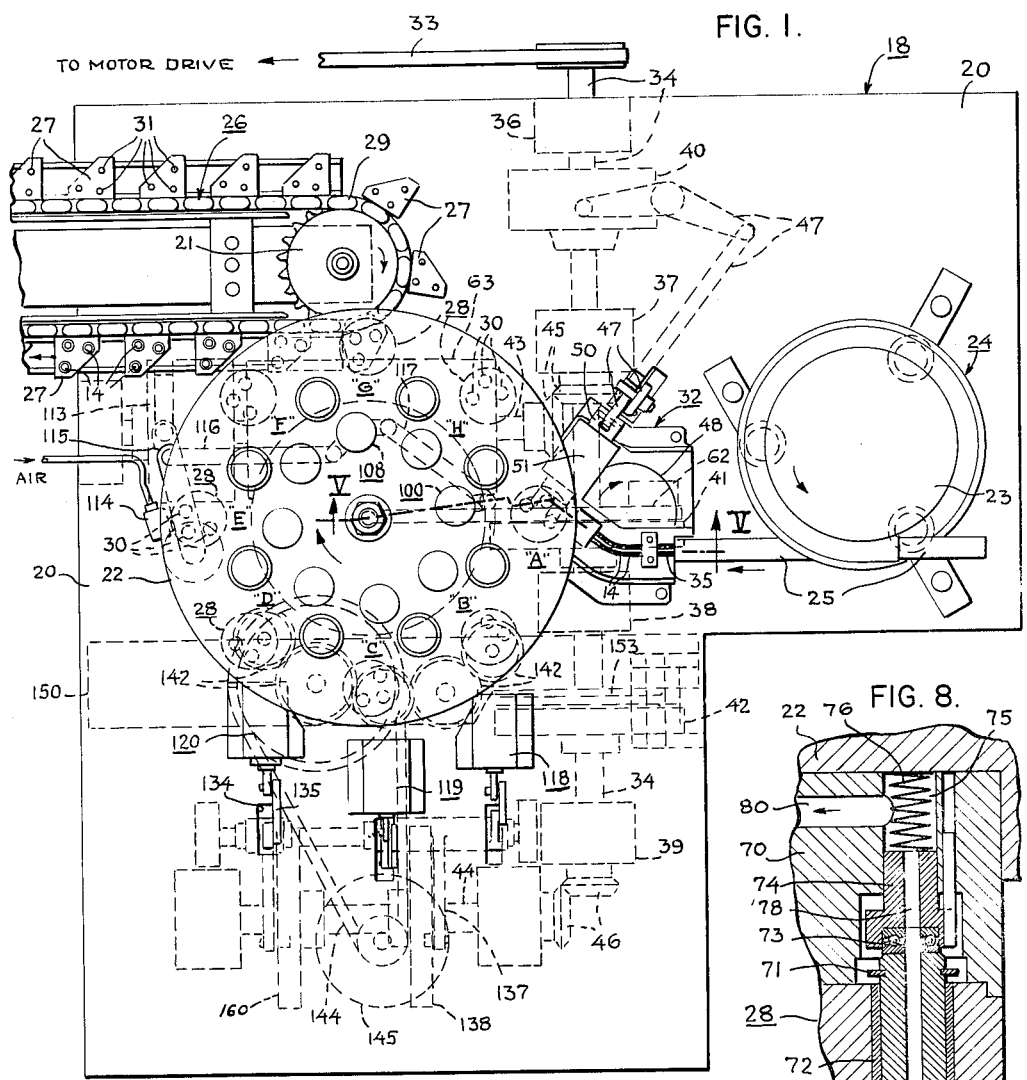
INVENTORS.
HENRY P. HASELL and
GEOFFREY A. DAINES.
BY
D. S. Buley
AGENT.

July 26, 1966  H. P. HASELL ETAL  3,262,296
APPARATUS FOR REPAIRING AND FEEDING HOLLOW METAL ARTICLES
Filed June 14, 1963  5 Sheets-Sheet 2
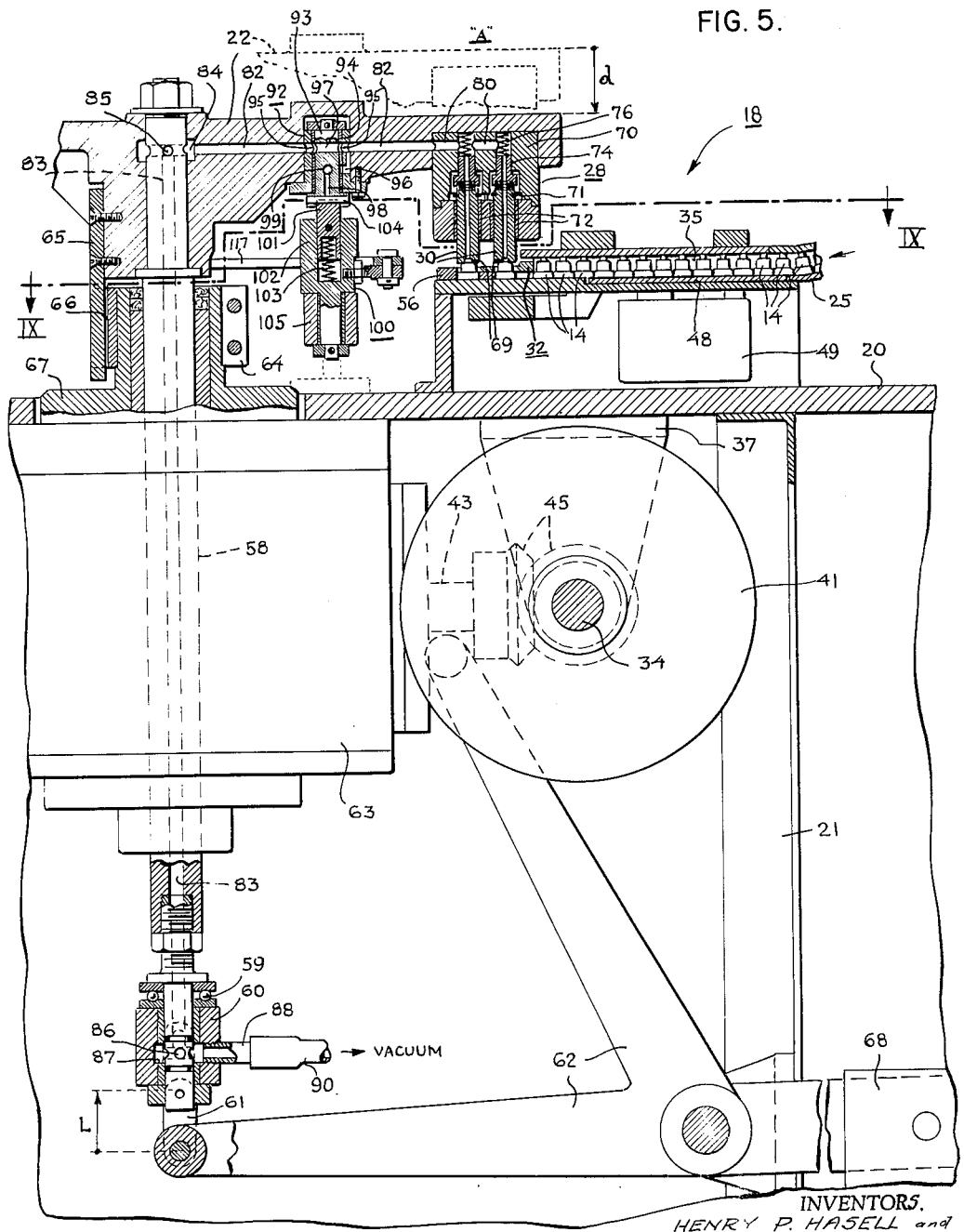

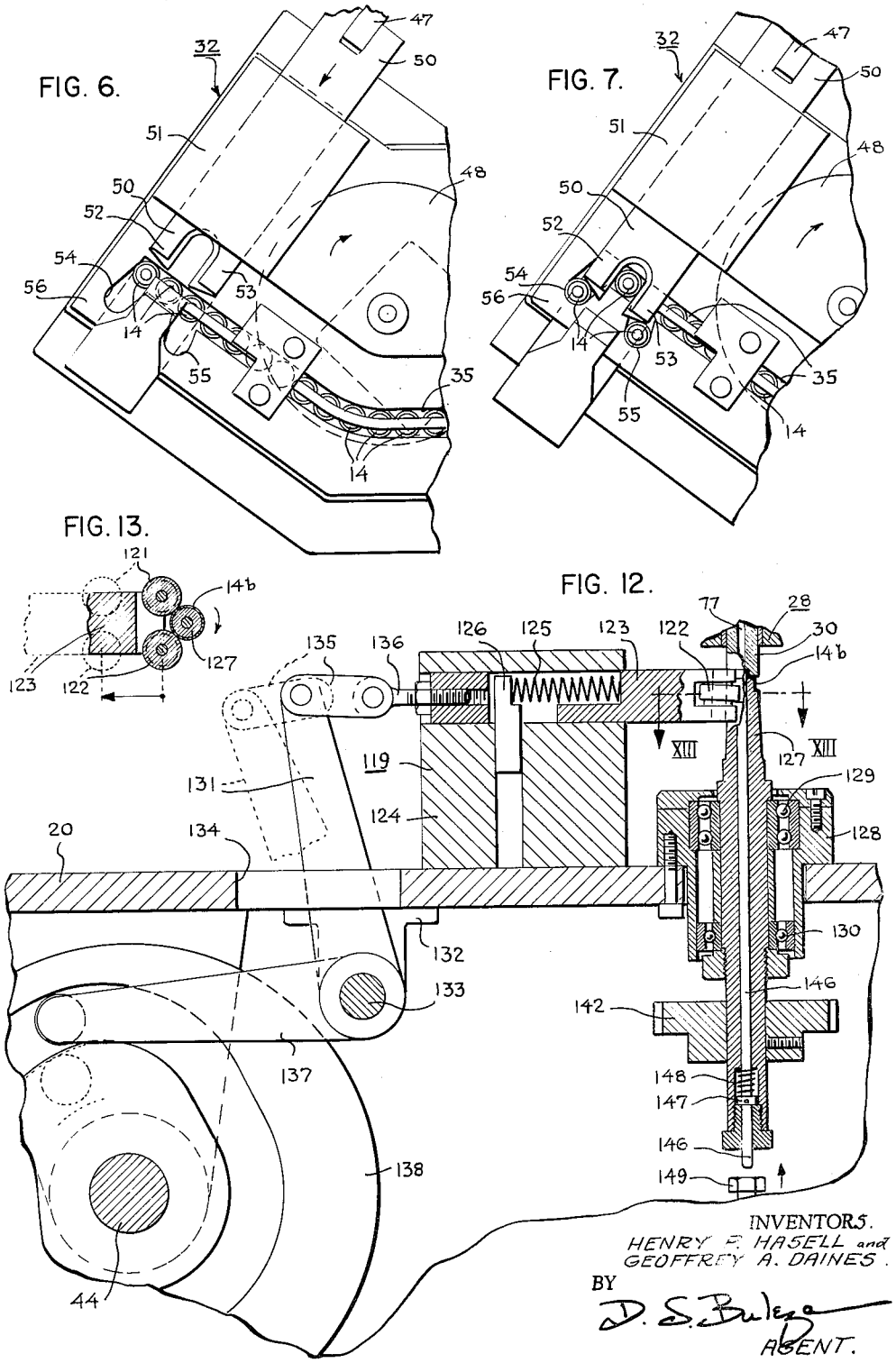

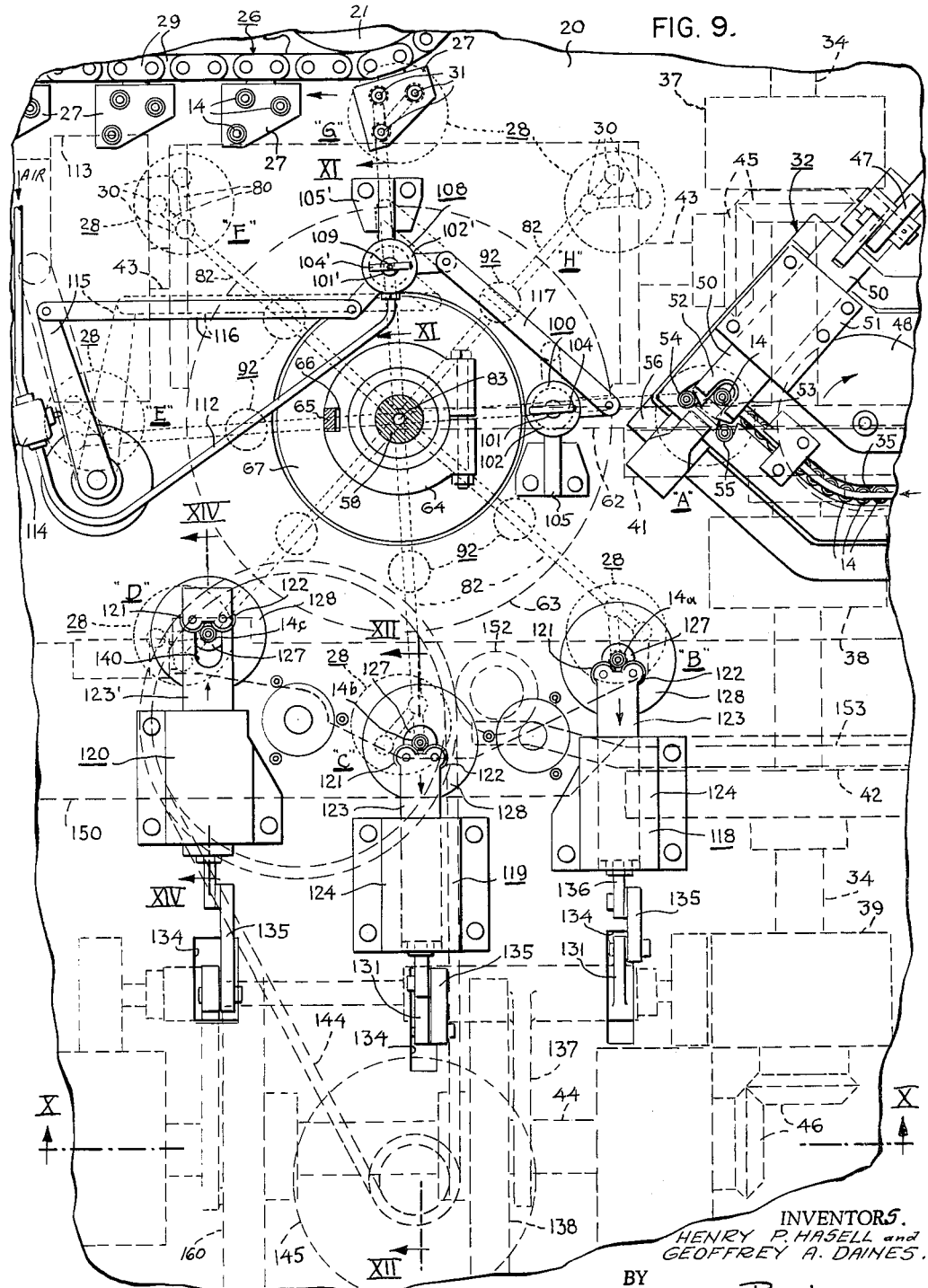

United States Patent Office 3,262,296
Patented July 26, 1966

3,262,296
APPARATUS FOR REPAIRING AND FEEDING HOLLOW METAL ARTICLES
Henry P. Hasell, Bloomfield, and Geoffrey A. Daines, West Caldwell, N.J., assignors to Westinghouse Electric Corporation, Pittsburgh, Pa., a corporation of Pennsylvania
Filed June 14, 1963, Ser. No. 287,919
13 Claims. (Cl. 72—86)

This invention relates to the manufacture of electric lamps and has particular reference to apparatus for automatically repairing metal ferrules of the type used in sealed beam automotive headlamps, and then feeding them to an automatic ferrule-inserting machine.

In sealed beam headlamps as presently manufactured the filament (or filaments) are supported within the glass envelope by rigid lead wires that are fastened to metal ferrules sealed into apertures provided at the back of the reflector portion of the envelope. These ferrules resemble hollow thimbles and serve as pin contacts for the lamp. They have a skirt at their open end that tapers down to a very thin or so-called "feather" edge to ensure that an hermetic seal is made when this portion of the ferrule is sealed to the glass reflector. The wall thickness of this "feather" edge is approximately 0.0025" and, thus, it is very easily and frequently damaged during shipment and handling in the factory. It is of the utmost importance that any nicks, burrs or other imperfections in the edge or skirt portions of the ferrule be removed before the sealing-in operation, otherwise the seal will leak at these points and the lamp will be ruined.

In order to eliminate this source of shrinkage it was the prior art practice to manually inspect each of the ferrules and repair any imperfections or damage with a hand-operated rolling device. While this solved the problem of excessive shrinkage it required the use of an operator and was not entirely reliable insofar as the quality of the "feather" edge depended entirely upon the operator's judgement. In addition, this method of repairing damaged ferrules necessitated manual loading of the ferrules onto the conveyor that transferred them to the ferrule-inserting machine. This entire phase of the operation was, accordingly, very time-consuming, inefficient and expensive.

It is, accordingly, the general object of the present invention to provide apparatus that will overcome the foregoing and other disadvantages of the prior art mode of processing such articles and greatly facilitate the manufacture of sealed beam headlamps and similar devices that require ferrules.

Another object is the provision of apparatus that will automatically process metal ferrules and provide a continuous supply of processed ferrules having sealing edges of uniform quality.

Still another object is the provision of an automatic ferrule repairing-and-feeding apparatus that will process a predetermined number of ferrules as a group and place them on a supply conveyor in the same geometrical pattern as that of the apertures in the glass reflector in which they will subsequently be sealed.

A further object is the provision of apparatus for automatically repairing and then transferring a predetermined number of metal ferrules onto a conveyor wherein the speed and operation of the apparatus are synchronized with the movement of the conveyor.

The foregoing objects, and other attendant advantages which will become apparent as the description proceeds, are achieved according to this invention by means of a machine having an eight-head turret that is indexed through a plurality of stations located at predetermined points around its periphery. The index speed of the turret is synchronized with that of the supply conveyor and the ferrule-inserting machine so that the required number of ferrules are fed onto the conveyor at prescribed intervals. As the turret indexes, the heads are successively advanced to a loading station where a predetermined number of ferrules are picked up by chucks provided in each head, through a series of repair stations where preselected ones of the ferrules are processed, and then to an unloading station where the repaired ferrules are transferred to the conveyor.

A device located at the loading station properly orients the ferrules so that they will be aligned with the holding chucks and subsequently placed on the conveyor in the desired geometrical pattern or array. The various tools and devices located at each station of the machine are actuated in predetermined sequence by means of interconnecting gears, cams, levers, etc. which are so designed that the movement of the turret and tools are coordinated and the repair and unloading of the ferrules are performed in a very precise and efficient manner.

A better understanding of the invention will be obtained by referring to the accompanying drawings, wherein:

FIGURE 1 is a top plan view of the ferrule repair-and-feeding apparatus embodying the present invention;

FIG. 2 is a diagrammatic plan view of the apparatus showing the various stations through which the turret indexes;

FIG. 3 is a perspective view on an enlarged scale of a metal ferrule of the type which the apparatus processes;

FIG. 4 is an enlarged cross-sectional view of the ferrule sealed into the apertured boss on the back of the reflector section of a sealed beam lamp envelope;

FIG. 5 is a fragmentary vertical sectional view through the apparatus along the line V—V of FIG. 1, in the direction of the arrows;

FIG. 6 is an enlarged plan view of the ferrule dispensing-and-positioning assembly located at the loading station of the machine;

FIG. 7 is a similar view of the assembly just after the slide has re-oriented the first and third ferrules at the end of the row;

FIG. 8 is an enlarged fragmentary sectional view of one of the three ferrule holders or chucks located in each head of the machine;

FIG. 9 is a fragmentary plan view, partly in section, along the line IX—IX of FIG. 5 showing the valve actuator units at the loading and unloading stations A and G, respectively, and the tools located at each of the three repair stations B, C and D;

FIG. 12 is a fragmentary vertical sectional view through repair station C, along the line XII—XII of FIG. 9, illustrating the roller tool in engagement with the skirt and "feather" edge of the ferrule located on the end of the rotating spindle located at that station;

FIG. 13 is a fragmentary cross-sectional view of the tool along the line XIII—XIII of FIG. 12, in the direction of the arrows.

Figure 10:
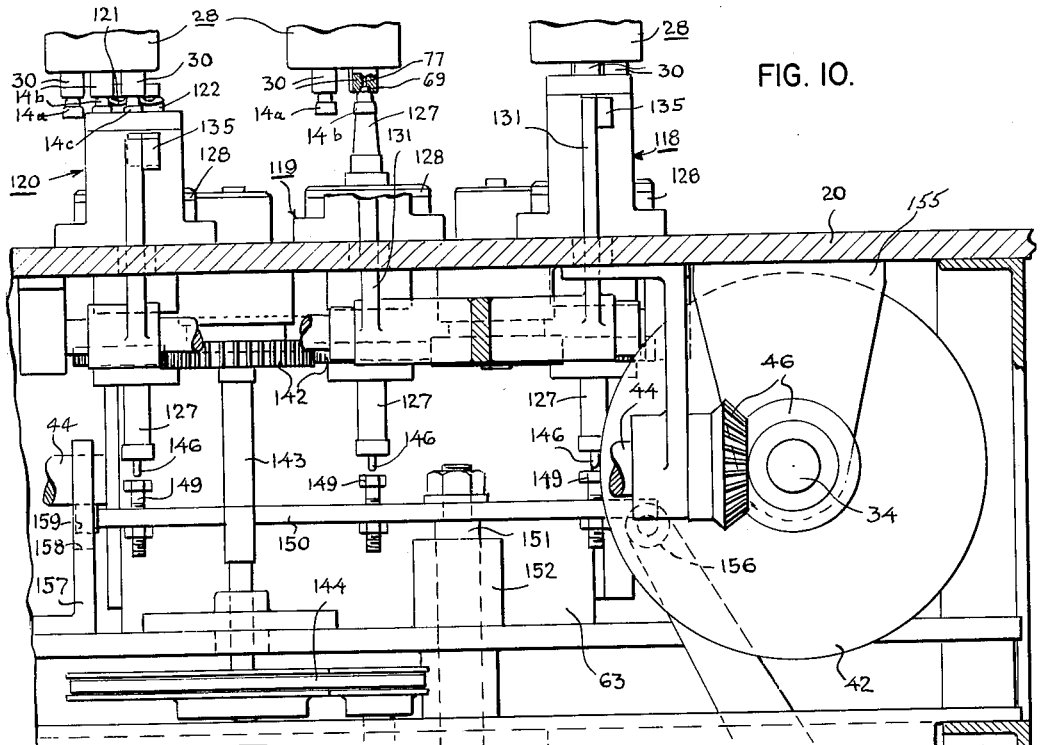
FIG. 10 is a fragmentary vertical sectional view along the line X—X of FIG. 9, in the direction of the arrows, showing the repair tools together with their actuating means and the apparatus for stripping the ferrules from the spindles after the repair operation has been completed.

While the principles of the present invention can be used with advantage in automatically repairing and feeding various types of hollow articles having delicate rims or sealing edges, it is especially adapted for use in repairing metal ferrules of the type used in sealed beam headlamps and it has, accordingly, been so illustrated and will be so described.

FERRULE CONSTRUCTION

As shown in FIG. 3, the metal ferrules 14 resemble a hollow thimble of stepped contour having a large diameter skirt 15 at its open end that tapers to a fine or "feather" edge. The wall thickness of the skirt 15 is tapered in this fashion to insure that an air-tight seal is achieved when the skirt is sealed into the reflector portion 16 of the lamp envelope, as shown in FIG. 4. It is extremely important that the skirt and edge portions of the ferrules be free from burrs or nicks and the like which would create strains or discontinuities in the seal and weaken it or cause it to leak.

APPARATUS—GENERAL

As shown in FIGS. 1, 2 and 5, the apparatus 18 of the present invention consists in general of a bed plate or platform 20 having a rotatable turret 22 mounted thereon. The turret is located at about the center of the platform between a vibratory dispenser 24 and one end of a conveyor 26 that supplies the ferrule-inserting machine (not shown). The turret 22 is provided with eight heads 28 that are uniformly spaced around the periphery of the turret. As shown in FIG. 5, the platform 20 is supported in a horizontal raised position by a frame 21 and the turret 22 is supported at a predetermined distance above the platform by a hollow shaft 58. As will also be noted in this figure, the heads 28 are attached to the underside of the turret and project downwardly toward the platform. Each of the heads carry three holders or chucks 30 that protrude beyond the end of the head and are spaced predetermined distances from one another in a triangular pattern (see FIG. 1).

As illustrated in FIGS. 1 and 2, as the turret 22 is indexed in a clockwise direction, as indicated by the arrows, the heads 28 are successively advanced through eight work stations A through H located around the periphery of the turret. The first station A comprises a loading station that is located at the end of a track 25 that extends from a vibratory dispenser 24 to a ferrule-positioning device 32 mounted on top of the platform 20 at the loading station. From the loading station A the heads 28 are indexed through three repair stations B, C and D, two stations E and F at which no operations are performed, to an unloading station G that is located on the path traversed by the conveyor 26, and then to another open station H. A pre-selected and different ferrule in each of the heads is repaired at stations B, C and D by tools 118, 119, and 120.

As shown most clearly in FIG. 1, the conveyor 26 consists of a plurality of uniformly spaced carriers 27 connected by an endless chain 29 that is engaged by a sprocket 21 located adjacent the unloading station. Each of the carriers 27 carry three upstanding pins 31 arranged in the same triangular pattern as the holding chucks 30 so that ferrules ejected from the head at the unloading station G are seated on the pins of the carrier then located at this station. The conveyor 26 passes between the platform 20 and the turret 22 and is driven by the inserting machine (not shown) which also drives the repairing-and-feeding machine 18 through a chain-and-sprocket assembly 33. Thus, the operation of the turret 22 and conveyor 26 is synchronized and an empty carrier 27 is indexed into position at the unloading station G each time a new head 28 is indexed into this station.

The aforementioned chain-and-sprocket assembly 33 is connected to a main drive shaft 34 that is rotatably fastened to the underside of the platform 20 by a series of bearings 36, 37, 38 and 39 shown in dotted outline in FIG. 1. Also attached to this main drive shaft is a cam 40 which actuates the ferrule-positioning device 32, a second cam 41 which actuates the turret raising-and-lowering mechanism, and a third cam 42 which actuates a device for stripping the ferrules from spindles located at each of the repair stations, as hereafter described. Power for the repair tools 118, 119 and 120, indexing drive unit 63 and valve actuator units 100 and 108 (see FIG. 9) is derived from two auxiliary drive shafts 43 and 44 disposed at right angles to the main drive shaft 34 and driven by the latter through level gears 45 and 46, respectively, which components are shown in dotted outline in FIG. 1. Each of the devices and tools which coact to position, pick up, repair and then automatically feed the ferrules in groups of three onto the conveyor 26 will now be described, together with their associated drive gears, cams, etc.

FERRULE DISPENSING-AND-POSITIONING ASSEMBLY

As shown in FIG. 1, a vibratory feeder 24 of conventional design is mounted on top of the platform 20 in a position such that ferrules are fed from the hopper 23 into a curved track 25 which, in turn, inverts and feeds them into a slot 35 in the ferrule-positioning unit 32 located at loading station A. This unit is actuated by interconnected levers 47 located beneath the platform 20 and actuated by the cam 40. As shown more particularly in FIGS. 5 to 7, the ferrules 14 are fed into the positioning unit 32 in single-row formation open end downward and are kept tightly packed by a slowly rotating disc 48 that is located underneath the feeding slot 35 and pushes the ferrules toward the end of the slot located directly below the head 28 positioned at loading station A. The disc is rotated in the proper direction by a motor 49 mounted between the positioning unit 32 and the platform 20, as shown in FIG. 5.

As illustrated in FIGS. 6 and 7, the ferrule-positioning unit 32 comprises a slide 50 held by a bracket 51 in such a position that it is movable toward and away from the end of the row of ferrules 14 located in the receiving slot 35. One end of the slide 50 is coupled to the cam 40 through the levers 47 and the opposite end of the slide has its central portion cut away to provide two fingers 52 and 53. These fingers are so spaced that they engage the first and third ferrules at the end of the row when the slide 50 is advanced and push them into pockets 54 and 55 provided in a plate 56 mounted below the slide. Thus, the reciprocatory movement imparted to the slide 50 by the cam 40 and levers 47 displaces the first and third ferrules in such a manner that they are located predetermined and equal distances on either side of the second ferrule, which remains undisturbed, thereby precisely positioning the last three ferrules in the row in the triangular pattern shown in FIG. 7.

The positioning unit 32 is so oriented relative to the turret 22 that the chucks 30 of the head 28 located at the loading station A are positioned directly above and in line with the aforementioned positioned ferrules.

TURRET AND DRIVE ASSEMBLIES

As shown in FIG. 5, the turret 22 is supported above the platform 20 by a hallow shaft 58 that has its lower end rotatably fastened through a bearing 59 to a stationary sleeve 60. This sleeve is, in turn, coupled by means of a link 61 to the end of a V-shaped lever arm 62 that is pivotally connected to the frame 21 and actuated by cam 41 attached to the underside of the platform 20 by a bracket 37 and driven by the main drive shaft 34. The configuration of cam 41 is such that the lever arm 62 periodically raises and lowers the end of the shaft 58 a predetermined distance L, as indicated in the drawing. This, in turn, causes the turret 22 to rise vertically to an elevated position above the platform 20, as indicated by the dotted outline of the turret in FIG. 5, and then drop a distance *d* (equivalent to the rise L of the shaft 58) as indicated.

The turret 22 is also coupled to an indexing drive unit 63 by means of a collar 64 and a key 65 that is fastened to the turret and rides in a keyway 66 provided in the collar (see FIG. 9). The collar 64 is attached to a bearing 67 driven by the indexing unit 63 which, in turn, is driven by the auxiliary drive shaft 43 as shown in FIG. 5. The cam 41 and indexing drive unit 63 are so designed that the turret 22 is periodically rotated or indexed from station to station and reciprocably raised and lowered a predetermined distance *d* as it leaves and reaches each station, respectively. Since the turret 22 and conveyor 26 are both driven by the ferrule-inserting machine, the turret is indexed through the various stations in synchronism with the indexing of the conveyor.

To avoid excessive wear of the cam 41 and strain on lever arm 62 a counterweight 68 is attached to the arm to reduce the downward force exerted by the relatively massive turret 22.

HEAD AND CHUCK ASSEMBLIES

As shown in FIG. 5, and more particularly in FIG. 8, each of the chucks 30 in the heads 28 are retained within the head housing 70 by a stop ring 71 attached to the inner end of the chuck. The chuck is thus free to rotate within the head on a sleeve bearing 72 and a thrust bearing 73 located between its inner end and the lower end of a plunger 74 that is keyed to and rides within a cavity 75 in the housing 70. A compression spring 76 disposed in the cavity between the turret 22 and upper end of plunger 74 permits the chuck to be pushed upwardly against the action of the spring. This enables the chucks to compensate for minor variations in ferrule height and prevents the ferrules from being crushed when being picked up by the chucks. The lower end of each chuck 30 is provided with a cavity 69 and protrudes a predetermined distance beyond the head 28. The cavity is shaped to nestingly accommodate the closed end or crown of the ferrule 14, as shown in FIG. 8.

The downward thrust exerted by the spring 76 on the chuck 30 has the additional advantage of enabling the chucks to firmly clamp the ferrules 14 on the ends of the spindles 127 (as shown in FIG. 8) during the repair operation described hereafter.

VACUUM PICK-UP SYSTEM

The ferrules 14 are retained in the chucks 30 by means of a vacuum. This is accomplished by connecting each of the chuck cavities 69 with a vacuum system through the aperture 77 in the chucks 30 (see FIG. 8), connecting aperture 78 in the plunger 74, spring cavity 75, passageways 80 that connect the chucks with each other (see FIG. 9), and a port 82 in the turret 22 (see FIG. 5).

As illustrated in FIG. 9, each of the heads 28 are connected with a port 82 that extends radially from the respective heads to the center of the turret 22. As shown in FIG. 5, these ports 82 connect with the bore 83 of the hollow support shaft 58 through a cavity 84 located at the center of turret and an aperture 85 in the upper end of the shaft. The lower end of the shaft 58 connects with a similar aperture 86 and cavity 87 in the stationary sleeve 60, which cavity communicates with a nipple 88 that extends through the sleeve and is connected to a conduit 90. This conduit is, in turn, connected to a suitable vacuum system (not shown). Thus, the cavities 69 in each of the heads 28 can be connected with the vacuum system. This condition prevails while the heads are indexed from the loading station A to the unloading station G so that the ferrules are retained in the chucks.

VALVE ASSEMBLIES

The application of vacuum to the chucks 30 is automatically controlled according to the invention by a series of valve assemblies 92 which, as shown in FIG. 5, are fastened to the underside of the turret 22 approximately midway between the center of the turret and each of the respective heads 28. Each valve assembly consists of a stem 93 which is rotatably mounted within a bushing 94 attached to the turret at a point in the respective radial ports 82 located between the heads 28 and the shaft 58. The bushing has openings 95 which are aligned with the port 82. The valve stem 93 has a laterally extending aperture 97 at its upper end and an axially extending aperture 98 at its lower end that is connectable to another opening 96 in the bushing by a laterally extending passageway 99 disposed at right angles to the aforesaid laterally extending aperture 97. The cavities 69 in each of the chucks 30 are thus either connected to or shut off from the vacuum system, depending upon the position of the valve stem 93 and whether or not the lateral aperture 97 is aligned with openings 95 and port 82, which condition is shown in FIG. 5.

VALVE ACTUATORS

The valves 92 are operated by actuators 100 and 108 that are mounted on top of the platform 20 adjacent the loading station A and unloading station G, respectively, as shown in FIG. 9. As will be noted in FIG. 5, the actuator 100 consists of a stud 101 that is vertically movable within a cylindrical sleeve 102 against the action of a compression spring 103 located within the sleeve. The stud has a laterally extending pin 104 at its upper end which engages a matching slot in the bottom face of the valve stem 93. The sleeve 102 is rotatably mounted in a bracket 105 that is attached to the platform 20. The actuator 100 is so located that the valves 92 are aligned with the stud 101 when the heads 28 are successively indexed into the loading station A.

Figure 11:
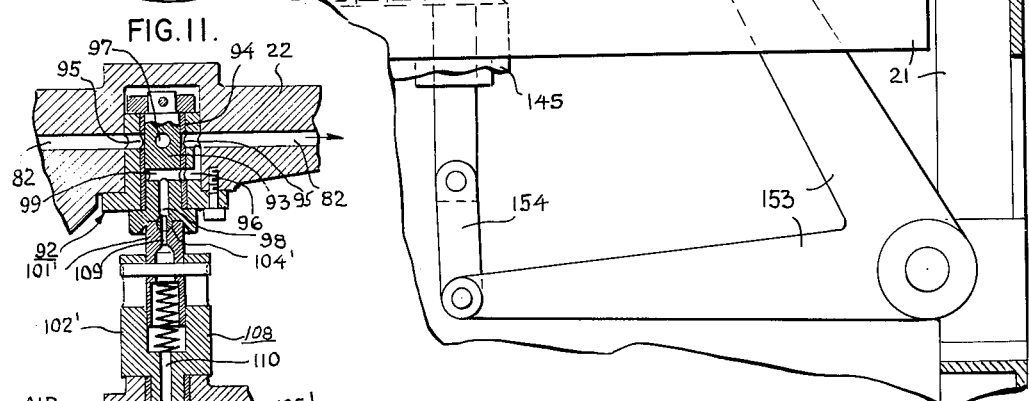
FIG. 11 is a fragmentary vertical sectional view along the line XI—XI of FIG. 9 showing the turret valve in position to admit compressed air to each of the chucks in the head located at the unloading station G.

As shown in FIG. 11, the valve actuator 108 located at the unloading station G is of the same general construction as the actuator 100 except that the stud 101' has an aperture 109 at its upper end that extends through the pin 104' and communicates with the axially extending aperture 98 in the valve stem 93. The sleeve 102' is also provided with an aperture 110 at its lower end that communicates with aperture 109 through the spring cavity and with a passageway 111 in the bracket 105' which, in turn, connects with a conduit 112 attached to the bracket.

As shown in FIG. 9, the conduit 112 extends across the platform 20 and connects with a compressed air supply through a valve 114 that is so positioned that it is contacted by and alternately opened and closed by a lever 115 actuated by a cam 113 attached to auxiliary drive shaft 43. This lever is, in turn, connected to the rotatable sleeve 102' of the valve actuator 108 through a link 116, and to the other actuator 100 through another link 117. The movement of the cam lever 115 and links 116, 117 are such that the air valve 114 is opened when the arm is fully displaced in one direction (shown in full lines in FIG. 9), and the air valve is closed and the pins 104 and 104' of the actuators 100 and 108, respectively, are rotated 90° in a counter-clockwise direction when the lever is shifted to the opposite end of its travel, as indicated by the dotted line portion of FIG. 9.

REPAIR TOOLS AND DRIVE MEANS

The ferrules 14 picked up by the heads 28 at the loading station A are repaired at the succeeding stations B, C and D by tools 118, 119 and 120, as shown in FIGS. 1 2 and 9.

As illustrated more particularly in FIGS. 12 and 13, each of the repair tools (in this case tool 119) consists of a pair of rollers 121, 122 rotatably fixed to the forked end of a slide holder 123 that is resiliently coupled to a bracket 124 by a compression spring 125 and a pin 126 located within the bracket. The bracket is rigidly fastened to the top of the platform 20 at the repair station (station C in this instance) in a position such that the rollers are movable toward and away from the skirt portion 15 and "feather" edge of a preselected ferrule 14*b* carried by the head 28 then located at that particular station. The ferrule 14b is held in pressured engagement with the rollers by a rotating spindle 127 that is rotatably mounted in and extends through the platform 20 by a housing 128 and a pair of ball bearings 129, 130, as shown in FIG. 12.

The movement of the slide holder 123 and rollers 121, 122 toward and away from the ferrule is accomplished and controlled by a lever 131 (see FIG. 12) that is rotatably attached to the underside of the platform 20 by a bracket 132 and an axle 133 and extends upwardly through an opening 134 in the platform. The upper end of the lever 131 is connected to the slide holder 123 by a link 135 and a pin 136. The reciprocatory movement of the lever 131 (illustrated by the phantom showing in FIG. 12) is achieved through an arm 137 that is fastened to the shaft 133 and engages a cam 138 driven by the auxiliary drive shaft 44. The repair tools 118 and 119 at stations B and C are identical and are both actuated by the cam 138. They are so located with respect to the heads 28 and chucks 30 that the rollers 121, 122 of tool 118 at station B straddle and engage the skirt and edge portions of the ferrule 14a then located nearest the periphery of the turret 22, as viewed in FIG. 9, and the rollers of tool 119 engage the corresponding portions of ferrule 14b located to the right of ferrule 14a at station C.

However, since the remaining ferrule 14c is located to the rear of the aforementioned ferrules at station D, space limitations require that it be engaged by the rollers from the rear as shown in FIG. 9. The repair tool 120 is thus different from tools 118 and 119 and employs a modified form of slide holder 123', as illustrated in FIG. 9 and more particularly in FIG. 14. As will be noted in FIG. 14, holder 123' has an opening 140 through which the spindle 127 extends. The rollers 121, 122 are mounted on the rearward upstanding portion of the holder and are moved toward and away from the ferrule 14c from a location behind the spindle 127, as indicated by the dotted line showing and arrow in FIG. 14. Thus, while the repair operations at stations B and C are performed by advancing the slide holders 123 toward the respective ferrules 14a and 14b, the slide holder 123' at station D is pulled toward the ferrule 14c in the opposite direction. The holders are also moved in opposite directions away from the respective ferrules after the repair operation is finished, as indicated by the arrows in FIG. 9. This reverse reciprocatory movement of the slide holder 123' is achieved by a separate cam 160 (see FIGS. 1 and 9) that is driven by the auxiliary drive shaft 44 and actuates the same arrangement of arms, levers, links etc., as that employed at stations B and C.

Figure 14:
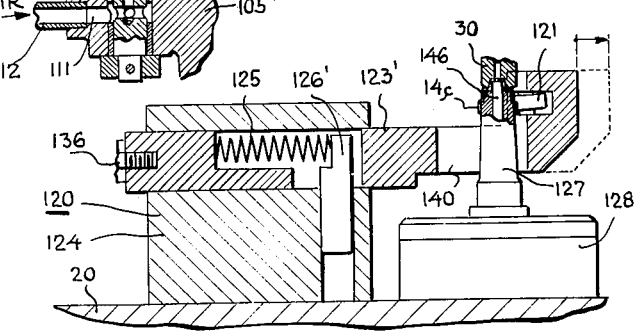
FIG. 14 is a fragmentary sectional view along the line XIV—XIV of FIG. 9 showing the repair tool at the last repair station D.

As will be noted in FIG. 14, since the slide holder 123' of tool 120 has a reverse movement, the pin 126' which holds the compression spring 125 in place within the housing 124 is located at the opposite end of the spring in order to effect the desired pressuring of the rollers 121, 122 against the skirt and edge of the ferrule 14c.

SPINDLE AND DRIVE ASSEMBLIES

As shown in FIG. 10, each of the spindles 127 are rotated at a relatively high rate of speed by a series of interconnecting spur gears 142 that are driven by a vertical drive shaft 143 which is coupled by a belt and pulley drive 144 to an electric motor 145 mounted on the frame 21 beneath the platform 20. Since the chucks 30 are spring loaded and are free to rotate, they clamp the ferrules firmly against the end of the spindles 127 and all three members rotate as a unit. The skirt and edge portions of the ferrules are thus rotated between the abutting rollers 121, 122 and any dents, nicks etc. that may be present in the ferrules are removed.

As shown in FIGS. 12 and 14, the upper ends of the spindles 127 have the same contour as the ferrules and thus serve as snug fitting mandrels during the repair operations.

FERRULE STRIPPING TOOL

To insure that the ferrules are removed from the respective spindles 127 after the repairing operation is completed and are retained in the chucks 30 when the turret 22 rises, means for stripping them from the spindles is provided at each of the repair stations B, C and D. As shown in FIG. 12, the stripping tool comprises a rod 146 that extends through and is movable within a bore in the spindle 127. The rod is normally positioned so that its upper end is located within the crown of the ferrule seated on the end of the spindle and its lower end projects a predetermined distance beyond the bottom of the spindle. A retaining ring 147 and compression spring 148 recessed within the lower end of the spindle are coupled to the rod 146 in such a manner that the rod is movable vertically a predetermined distance from its normal position against the action of the spring by a reciprocating adjustable screw 149.

As illustrated in FIG. 10, one such screw 149 is provided for each of the stripper rods 146 and are supported directly beneath them by a plate 150 that is fastened to a support shaft 151. The shaft is reciprocably movable in a vertical direction within a sleeve 152 affixed to the frame 21, and the lower end of the shaft is coupled to a V-shaped lever arm 153 by means of a link 154. The lever arm is pivotally attached to the frame 21 and is actuated by a cam 42 and a cam follower 156. The cam is attached to the underside of the platform 20 by a bracket 155 and is driven by the main drive shaft 34. The plate 150 and screws 149 are thus periodically raised and lowered in accordance with a cycle defined by the cam 42 and the stripper rods 146 are pushed upwardly and retracted in synchronism with the rising and lowering of the turret 22 and chucks 30.

As will be noted in FIG. 10, rotation of the plate 150 is prevented by an upstanding stop 157 that is fastened to the frame 21 at one end of the plate and provided with a vertical slot 158 which engages a roller 159 attached to the plate.

OPERATION

As shown in FIGS. 1 and 5, the ferrules 14 are fed by the vibrating hopper 23 into the inverted track 25 and dispensed in tightly-packed single-row formation open end downwards into the receiving slot 35 of the positioning unit 32. When the turret 22 is elevated by the cam 41, lever arm 62, link 61 and support shaft 58 (see FIG. 5), the slide 50 of the positioning unit 32 is actuated by the cam 40 acting through the levers 47 (FIG. 1). The movement produced by the cam 40 is such that the slide 50 moves forward and pushes the first and third ferrules at the end of the row into the pockets 54 and 55 and thus positions the last three ferrules in precise triangular formation (as shown in FIGS. 6 and 7) while an empty head 28 is being indexed from station H to the loading station A.

After the three ferrules have been positioned and the head 28 reaches station A, the turret 22 drops a predetermined distance d, as shown in FIG. 5, and the chucks 30 of the head then located at the loading station A seat against the crowns of the positioned ferrules and the latter nest within the cavities 69 in the ends of the respective chucks. At this point the valve 92 in the port 82 connecting with the aforementioned head is engaged and turned 90° by the valve actuator 100 through the action of the lever 115, links 116 and 117 and cam 113 (see FIGS. 5 and 9). This aligns the lateral aperture 97 in the valve stem 93 with the openings 95 in the bushing 94 and with port 82. The chuck cavities 69 are thus connected with the bore 83 of the hollow shaft 58 and with the vacuum system through the various apertures, cavities, passages etc. The three positioned ferrules are thus picked up by the chucks 30 as the turret 22 rises and advances to the first repair station B. Since the valve 92 remains in the aforesaid position, the chucks 30 remain connected to the vacuum system and the ferrules are retained in the chuck cavities by suction.

At the first repair station B the turret 22 is again lowered and the ferrule 14a located at the outermost tip of the triangle (see FIG. 9) engages and is seated upon the similarly contoured end of the rotating spindle 127, in the manner shown in FIG. 12, and the ferrule and chuck rotate with the spindle. At this point the holder 123 of tool 118 is advanced toward the spindle by the action of the cam 138 acting through the arm 137, lever 131, link 135 and pin 136 whereupon the rollers 121 and 122 are resiliently and firmly pressed against the skirt and edge of the rotating ferrule, as shown in FIG. 13, and effect whatever repairs are needed.

Just before the turret 22 rises and is indexed to the second repair station C, the holder 123 is retracted and the rollers 121, 122 pulled clear of the spindle 127 and ferrule 14a seated thereon. As the turret rises, the platform 150 (see FIG. 10) is elevated by the cam 42 acting through lever arm 153, link 154 and shaft 151 and pushes the stripper rods 146 upwardly in synchronism with the elevation of the turret and head. The ferrule 14a is thus forcibly pushed free from the end of the spindle 127 and remains seated in the chuck 30.

The turret 22 is then indexed to the second repair station C where the ferrule 14b located abreast of and to the right of ferrule 14a (as viewed in FIG. 9) is repaired in the same manner by the repair tool 119.

The turret 22 is again raised, indexed and lowered thus positioning the head 28 at the third repair station D where the remaining ferrule 14c is repaired by the tool 120, as shown in FIG. 9. In this case, however, the rollers 121 and 122 engage the ferrule from the rear by means of the specially shaped holder 123' (see FIG. 14) and the reverse movement provided by the separate cam 160 (see FIG. 9).

After each of the ferrules 14a, 14b and 14c have been repaired at stations B, C and D, the turret 22 is indexed through the succeeding stations E and F and into the unloading station G. Just after the head 28 is lowered into position above the conveyor 26 at the unloading station G, the valve 92 associated with this head is rotated 90° to its original position by the cam lever 115 and link 116 (see FIG. 9). This blocks the port 82, shuts off the vacuum and connects the head with the compressed air conduit 112 through the various passageways, openings, apertures etc. in the actuator 108 and those in the valve stem 93 and bushing 94.

When the cam lever 115 reaches the end of its travel, as shown in FIG. 9, it trips the air valve 114 thus connecting the head and chucks then located at the unloading station G with the supply of compressed air and forcibly ejecting the ferrules 14a, 14b and 14c onto the pins 31 of the conveyor carrier 27 located at this station.

After the turret 22 rises, both the turret and the conveyor 26 are indexed one position and the valve actuator 100 and 108 are rotated to their original positions by the cam lever 115 and links 116, 117. Thus, the valves 92 at the loading and unloading stations are operated in unison and vacuum is applied to one head and shut off from the other.

After the empty head 28 is indexed through the succeeding station H, it is again advanced to and lowered at the loading station A where three new ferrules are picked up and the foregoing cycle is repeated.

As will be appreciated from the foregoing, the objects of the invention have been achieved insofar as apparatus has been provided which automatically and efficiently repairs the fragile skirts and "feather" edges of a preselected number of ferrules on a mass production basis, and then feeds them in a predetermined pattern onto a conveyor. The various cams, levers, links, valves, actuators, etc., and movements thereof are so correlated that the positioning, loading, repairing and unloading of the ferrules is performed in synchronism with the inserting machine and conveyor means which supplies it so that a continuous carefully-regulated flow of repaired ferrules of uniform quality is maintained at all times.

While one form of apparatus has been illustrated and described, it will be appreciated that various changes in both the arrangement and operation of the various tools and assemblies can be made without departing from the spirit and scope of this invention. For example, each of the heads 28 can have two or even a single chuck rather than three, as in the illustrated embodiment, and the positioning unit 32 can be readily modified to orient the ferrules in any desired pattern or array. The repaired ferrules can also be unloaded onto the conveyor by the force of gravity alone, in which case the valve actuator 108 and associated air line 112 and valve 114 can be dispensed with.

We claim as our invention:

1. Apparatus for automatically arranging a plurality of hollow metal articles in a predetermined geometrical pattern and refinishing the peripheral edge portions of said articles while the latter are disposed in said pattern, which apparatus comprises,
   means for receiving a row of said articles disposed in upstanding side-by-side relation,
   means located adjacent said receiving means for arranging selected articles at the end of said row in the desired pattern,
   holding means adapted to pick up the arranged articles as a group and maintain them in the aforesaid pattern with their peripheral edge portions accessible,
   means for moving said holding means and group of articles to a series of work stations and then to an unloading station,
   means located at each of said work stations movable toward and away from a preselected and different one of the articles in the group carried by said holding means and adapted, when actuated, to engage and compressively roll the peripheral edge portion of that article, and
   means for actuating said rolling means when said holding means is located at the respective work stations.

2. Apparatus for automatically arranging a plurality of hollow articles in a predetermined geometrical pattern, refinishing the peripheral edge portions of the articles while the latter are so arranged, and then transferring such articles to a conveying means, which apparatus comprises;
   means for receiving a row of said articles and repositioning selected articles at the end of the row so that a plurality of articles are oriented in the desired pattern,
   holding means adapted to pick up the oriented articles as a group and maintain them in the aforesaid pattern with their peripheral edge portions accessible,
   means for moving said holding means and group of articles to a series of work stations and then to an unloading station along a predetermined path such that the articles, when at said loading station, are located adjacent said conveying means,
   means located at each of said work stations movable toward and away from a preselected and different one of the articles in the group carried by said holding means and adapted, when actuated, to engage and compressively roll the peripheral edge portion of that article,
   means for actuating said rolling means when said holding means is located at the respective work stations, and
   means for releasing the articles carried by said holding means, when the latter is located at said unloading station, and placing the released articles as a group on said conveying means.

3. Apparatus for automatically repairing the skirt and edge portions of hollow metal ferrule or similar article that is closed at one end, which apparatus comprises,
   a chuck adapted to receive the closed end of a ferrule and hold said ferrule so that its skirt and edge portions are exposed and accessible, means for moving said chuck to a work station and then to unloading station along a predetermined path, a spindle located at said work station having an end portion that is insertable into the open end of the ferrule carried by said chuck, means for rotating said spindle, means for moving said chuck toward and away from said spindle along a path such that a ferrule carried by said chuck will be seated on the said end portion of said spindle for a predetermined length of time while said chuck is at said work station, a freely-rotatable roller located at said work station, means for pressing said roller against and retracting it from the skirt and edge portions of a ferrule on the said end portion of said spindle after said ferrule has been seated thereon by said chuck, and means for ejecting said ferrule from said chuck when the latter reaches the unloading station.

4. Apparatus for automatically repairing the skirt and edge portions of a hollow metal ferrule or similar article as set forth in claim 3 wherein means associated with said spindle is provided for stripping the ferrule from the end of the spindle in synchronism with the movement of the chuck away from said spindle after the roller has been retracted.

5. Apparatus for automatically repairing the skirt and edge portion of a hollow metal ferrule or similar article as set forth in claim 6 wherein; a conveyor is disposed adjacent the unloading station, and said chuck is moved along a path such that the chuck is located above said conveyor when the chuck reaches the unloading station and the released ferrule is thus transferred by gravity to the conveyor.

6. Apparatus for automatically arranging a plurality of hollow metal ferrules or the like in a predetermined geometrical pattern and then repairing the skirt and edge portions of the ferrules and transferring them as a group to a conveyor having a like number of ferrule-retaining means arranged in the same pattern, which apparatus comprises;

a head adapted to receive the closed ends of a group of ferrules arranged in said pattern and hold such ferrules so that their skirt and edge portions are exposed and accessible, means for moving said head to a loading station and a series of work stations and then to an unloading station along a predetermined path such that said head is located above said conveyor at said unloading station, means at said loading station for receiving and positioning a predetermined number of ferrules as a group in the desired pattern open end downward, a spindle at each of said work stations located and adapted to receive a preselected and different one of the grouped ferrules carried by said head, means for rotating said spindles at a relatively high rate of speed, means for moving said head toward and away from the spindle at each of said work stations along a predetermined path such that a preselected ferrule in the group will be seated on the end of the spindle at a preselected work station for a portion of the time while said head is at that work station, a freely-rotatable roller located at each of said work stations, means for moving said rollers toward and away from the respective spindles along a path such that the rollers are pressed against the skirt and edge portions of the ferrule seated on the respective spindles, means synchronizing the movement of said head and conveyor so that the group of ferrules carried by said head are aligned with and located above the respective ferrule-retaining means on said conveyor when the head is located at the unloading station, and means for simultaneously releasing the ferrules carried by said head when the latter is positioned at said unloading station so that the released ferrules will drop as a group onto the aligned retaining means on said conveyor.

7. Apparatus for automatically repairing the skirt and peripheral edge portions of a metal thimble-like article and dispensing the repaired articles, which apparatus comprises, a turret having a plurality of uniformly spaced heads located around its periphery, a chuck in each of said heads adapted to receive the closed end of an article and hold said article so that the skirt and peripheral edge portions thereof are exposed and accessible for repair, means for indexing said turret so that each of said heads is sequentially advanced to a loading station, a work station and then to an unloading station, means for raising said turret a predetermined distance just before it is indexed from each station and then lowering it a corresponding distance when it reaches the succeeding station, a spindle at said work station located and adapted to enter the open end of the article carried by said chuck when the turret is indexed to and lowered at said work station, means for rotating said spindle at a relatively high rate of speed, a repair tool at said work station comprising a holder having a pair of rollers rotatably mounted thereon in spaced side-by-side relation, means for moving said tool toward and away from the end of said spindle along a path transverse to the spindle axis and in synchronism with the movement of said turret so that said rollers are (a) pressed against the skirt and edge portions of the article carried by said head immediately after the article is seated on said spindle and then (b) retracted before the turret is raised and the article is carried to the next station, and means associated with each of said heads and chucks for retaining the articles in the chucks as they are picked up at the loading station and then ejecting the repaired articles when the respective heads are indexed into and lowered at the unloading station.

8. In combination with a conveyor comprising a series of uniformly spaced carriers that are indexed along a predetermined path and have a plurality of ferrule-retaining elements on their upper surfaces arranged in a predetermined pattern, apparatus for positioning a corresponding number of metal ferrules in said pattern and then repairing and placing them on the retaining elements of said conveyor, which apparatus comprises, a rotatable substantially horizontal turret having a plurality of uniformly spaced heads disposed around its periphery, a platform supported a predetermined distance below said turret, a plurality of freely-rotatable chucks carried by each of said heads and projecting towards said platform, said chucks being equal in number to the number of ferrule-retaining elements on each of said conveyor carriers and being arranged in the same pattern, drive means for indexing said turret from a loading station through a series of repair stations equal in number to the number of chucks in each head and then to a loading station in synchronism with the movement of said conveyor, the paths traversed by said heads and said conveyor carriers being such that one of said carriers is located below the head located at the unloading station and the respective chucks and ferrule-retaining elements are aligned one with another, cam and lever means operable to raise said turret a predetermined distance just before it is indexed from each station and then lower it a corresponding distance when it reaches the succeeding station, means mounted on said platform at said loading station and adapted to receive a row of ferules open end downward and position the required number of ferrules at the end of the row into said predetermined pattern and in line with the chucks in a head located at said loading station, a spindle at each of said repair stations mounted on said platform and projecting upwardly therethrough toward said turret, the spindles at the respective repair stations being aligned with a preselected and different one of said chucks and disposed so that a ferrule carried by that chuck will be seated on the end of the spindle when the turret and respective head are lowered at that repair station, means attached to said platform for rotating each of said spindles at a relatively high rate of speed, a holder slidably mounted on the top of said platform at each of said repair stations and having a pair of spaced freely-rotatable rollers at one end, cam and lever means supported by said platform and operable in timed sequence with the indexing and raising and lowering of said turret to (a) advance the holders toward the spindles at the respective repair stations after a ferrule has been seated thereon and (b) retract said holders just before the turret and ferrules are raised, each of said holders being reciprocably movable along a path which is substantially normal to the axis of the respective spindles and located so that the rollers are pressed against the skirt and edge portions of the ferrule on the spindle located at that repair station, and means for automatically (a) connecting each of the chucks in said heads with a vacuum after the heads have been indexed into and lowered at said loading station and then (b) disconnecting the chucks from the vacuum after they have been indexed into and lowered at said unloading station so that the ferrules are retained in the respective heads as the latter are indexed through the repair stations and are released at the unloading station and drop onto and are engaged by the retaining means on the carrier of the conveyor then located at the unloading station.

9. The combination of a synchronized conveyor and a ferrule repairing-and-feeding apparatus as set forth in claim 8 wherein, the ferrule-positioning means at said loading station is connected by a track to a vibratory hopper that dispenses ferrules in single-row formation into the positioning means, a rotatable disc is mounted on the platform adjacent said positioning means in such a location that it slidably engages the open ends of the ferrules at the end of the row and maintains them in tightly packed relation, and said platform carries an electric motor that is connected to and drives said disc at a relatively slow rate of speed.

10. The combination of a synchronized conveyor and a ferrule repairing-and-feeding apparatus as set forth in claim 8 wherein, the ferrule-retaining means on the conveyor carriers comprise three upstanding pins disposed in a triangular pattern, each of said heads carries three chucks arranged in the same triangular pattern, the holder and roller assemblies at the first and second repair stations are actuated by a single cam, and the holder and roller assembly at the third repair station is actuated by a separate cam that moves the holder in a reverse direction relative to the holders at the first and second repair stations and presses the rollers against the skirt and edge portions of the ferrule at that station from a point located rearwardly of said ferrule.

11. The combination of a synchronized conveyor and a ferrule repairing-and-feeding apparatus as set forth in claim 8 wherein;

the upper end of each of said spindles have substantially the same contour as the ferrules and serve as a mandrel during the repair operation, each of said spindles contain a rod that is reciprocably movable therewithin to a position such that said rods protrude a predetermined distance beyond the upper ends of the respective spindles, and said platform carries drive means operable in response to the movement of said turret to engage the lower ends of said rods and raise the latter said predetermined distance each time the turret is raised and thereby strip the repaired ferrules from the respective spindles.

12. The combination of a synchronized conveyor and a ferrule repairing-and-feeding apparatus as set forth in claim 8 wherein;

said turret is supported by a hollow shaft that is reciprocably movable with respect to said platform and is connectable to a vacuum system, each of said heads are connectable to the bore of said shaft through rotatable valves that are mounted on the underside of said turret adjacent each of the heads and open and close a port that extends from each of the respective heads to said shaft, a first valve actuator adapted to engage and rotate said valves is mounted on said platform in a position to engage the valve associated with the head located at the loading station, a second valve actuator is mounted on top of the platform in a position to engage and rotate the valve associated with the head located at the unloading station, said second valve actuator has an opening therein that cooperates with an opening in the engaged valve and connects it to a conduit that is connectable to a compressed air supply, and said first and second valve actuators are linked to a cam and lever that rotate said actuators in unison through a predetermnied angle such that the head located at said loading station is connected to the bore of the hollow support shaft and the head located at said unloading station is connected to the compressed air conduit.

13. The combination of a synchronized conveyor and a ferrule repairing-and-feeding apparatus as set forth in claim 12 wherein;

an air valve is included in the compressed air conduit, and said air valve is so located relative to the cam lever which operates the first and second valve actuators that it is (a) actuated by said cam lever when the latter reaches a predetermined position and (b) is held open for a sufficient length of time by said lever to forcibly eject the ferrules from the head then located at the unloading station.

References Cited by the Examiner

UNITED STATES PATENTS

| 2,298,366 | 10/1942 | Gladfelter | 113—115 |
| 2,615,285 | 10/1952 | Gosnell | 72—110 |
| 2,687,163 | 8/1954 | Smith | 72—110 |
| 2,895,530 | 7/1959 | Luthi | 72—111 |

CHARLES W. LANHAM, *Primary Examiner.*

H. D. HOINKES, *Assistant Examiner.*